Feb. 20, 1962 R. A. KLEIST ETAL 3,022,492

INTERROGATOR-RESPONDER SIGNALLING SYSTEM

Filed Feb. 15, 1960

ROBERT A. KLEIST
CLARENCE S. JONES
INVENTORS

BY Richard G. Stephens
ATTORNEY

United States Patent Office 3,022,492

Patented Feb. 20, 1962

3,022,492
INTERROGATOR-RESPONDER SIGNALLING SYSTEM

Robert A. Kleist, Sunnyvale, and Clarence S. Jones, Los Altos, Calif., assignors to General Precision, Inc., Binghamton, N.Y., a corporation of Delaware Filed Feb. 15, 1960, Ser. No. 8,557
2 Claims. (Cl. 340—171)

This invention relates to interrogator-responder signalling systems, and more particularly, to an improved system employing transmission of a single sideband modulated signal to a passive responder which provides a coded response signal, which is coherently detected at or near the transmitter site. Appl. Ser. No. 739,909, filed June 4, 1958, by Clarence S. Jones for "Signalling System" and assigned to the same assignee as the instant invention, discloses an improved interrogator-responder system capable of electronically transmitting data between an interrogator device and one or more responder devices, where relative motion may occur between the interrogator device and each responder, so that signals may be provided from the responder which uniquely identify the responder, and, or instead, indicate one or more conditions associated with the responder. One exemplary disclosed application of the prior invention is the use of passive responder devices on vehicles, such as railroad box cars, for the purpose of identifying each car as it passes along a track adjacent to which an interrogator unit is located. The interrogator unit is essentially a transmitter-modulator connected to supply an interrogator signal on an interrogator frequency to an interrogator output conductor which is located near or under the railroad tracks. When a boxcar carrying a responder approaches and passes over the interrogator coil, operating voltage of sufficient magnitude is induced in the responder to cause emission by the responder of a coded response signal on a response frequency differing in frequency from the interrogator frequency. A response pickup coil located near the interrogator coil and tuned to the response frequency picks up the response signal, which consists of a radio frequency carrier having a plurality of audio frequencies modulated thereon. Each individual responder is designed so as to use a unique and different set of audio frequencies in modulating its response carrier, so that detecting and decoding a response signal may serve to identify a responder. Apparatus of the above-described type is marketed under the trademark "Tracer" by the assignee of this application.

Due to a number of reasons considered in detail in previous applications, the described apparatus is more accurate and reliable than prior systems and far less susceptible to noise than prior systems. The system also has much greater inherent "system capacity" without equipment duplication and with minimum bandwidth, and thus is economically superior to prior systems. System capacity refers to the number of different responders between which the system can distinguish. The present invention is an improvement over prior systems in that it provides systems of even greater accuracy and reliability which are even further less susceptible to noise. Any system which is more immune from noise than another system may be designed to use less power and/or bandwidth while still providing equal accuracy and reliability.

One main feature of the present invention which allows increased accuracy is coherent detection. Coherent detection itself is widely used in missile communications and various other applications, and, in fact, appl. Ser. No. 850,828, filed November 4, 1959, by Robert A. Kleist for "Signalling System" illustrates various ways in which coherent detection may be utilized in interrogator-responder signalling systems of the above-described type.

The previously proposed interrogator-responder systems using coherent detection, however, all have contemplated use of double sideband interrogation transmission and relatively complex response receiver circuits. The use of single sideband techniques allows great increase in system capacity and/or a great reduction in required bandwidth and power. The present invention allows use of coherent detection in a single sideband system that is notably simple, inexpensive and foolproof, and the present system allows the use of improved single sideband transmitter and responder circuits.

Figures 1, 2:
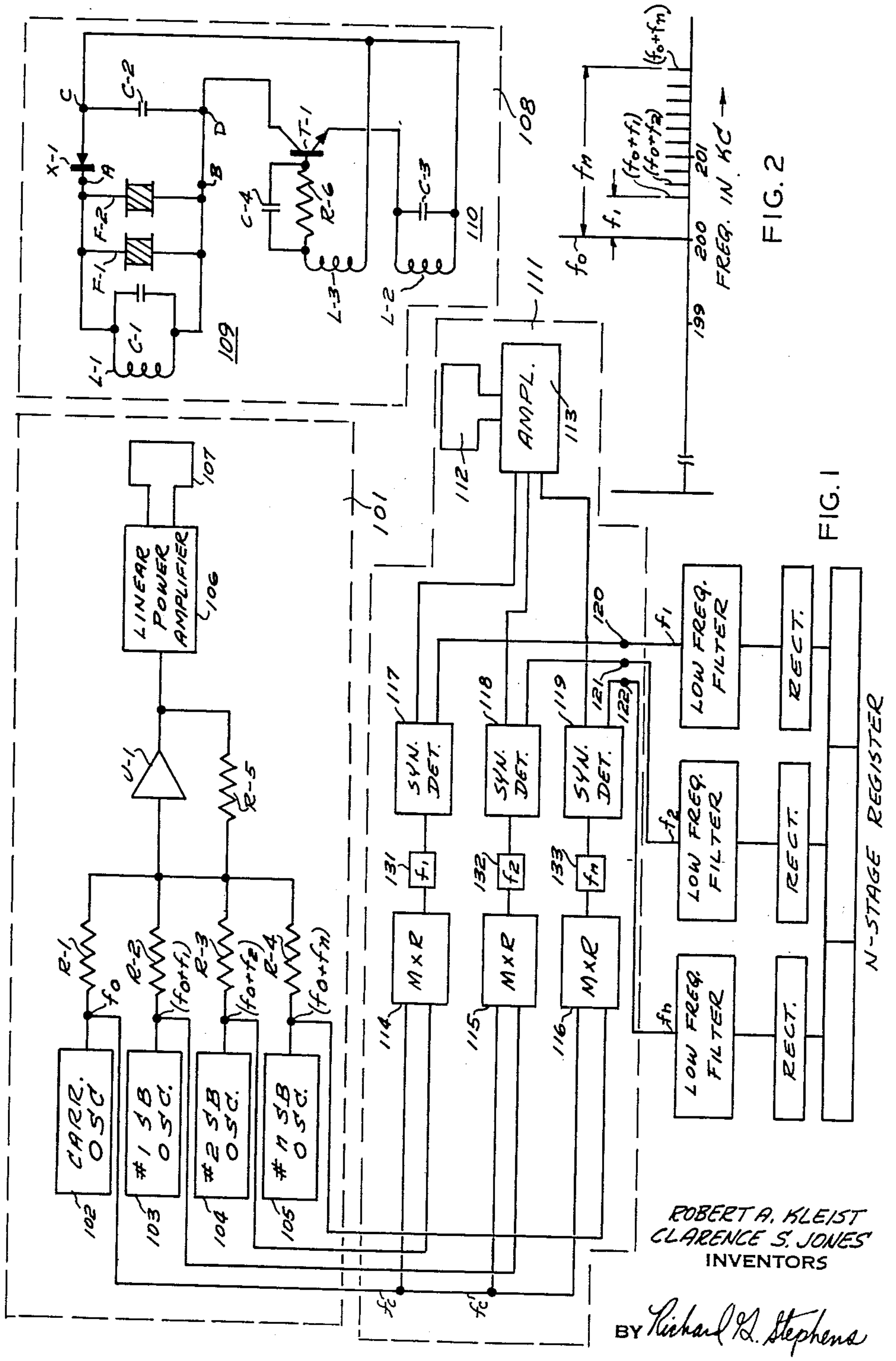
FIG. 1 is an electrical schematic diagram partially in block form illustrating an exemplary embodiment of the invention.
FIG. 2 is a spectrum graph illustrating the characteristics of a typical interrogator signal developed by the interrogator unit of the invention.

Shown in FIG. 1 within dashed lines are the three major sections of the system, the interrogator unit being shown at 101, a typical responder unit at 108 and the response receiver at 111. Though shown as separate sections in the drawing due to their separate functions, the interrogator unit and receiver units may be mounted principally on the same chassis, if desired, in many embodiments of the invention.

The interrogator unit 101 is shown as comprising an improved form of single sideband interrogator transmitter unit of a type described in detail and claimed in the copending application Ser. No. 15,597 filed on even date herewith by Robert A. Kleist for "Signalling System" and assigned to the same assignee as the present invention. The transmitter comprises a radio frequency carrier oscillator 102 which provides a carrier signal of frequency $f_0$, and a plurality of sideband oscillators, three of which (103, 104, 105) are shown in FIG. 1. Many more than three sideband oscillators may be provided, however, and only three are shown solely for sake of convenience. Carrier oscillator 102 and each of the sideband oscillators are preferably crystal controlled at fixed respective frequencies, the first sideband oscillator 103 being set at frequency $(f_0+f_1)$, the second sideband oscillator 104 being set at frequency $(f_0+f_2)$, etc., with the carrier frequency $f_0$ and each sideband frequency being applied through a respective scaling resistor (R–1, R–2, R–3, R–4) to a signal summing device shown as comprising a conventional feedback amplifier U–1, having a feedback impedance R–5. The signal output voltages from the different oscillators and the scaling resistors are proportioned relative to each other so as to provide a desired modulation pattern. If ten sideband oscillators are utilized, a sum signal such as that illustrated graphically in FIG. 2 may be provided. The sum signal output from summing circuit U–1 corresponds in nature to the output of a conventional single sideband transmitter. This signal output is amplified in linear power amplifier 106 (kept fairly linear in order to preserve relative sideband amplitudes) and applied to interrogator output or power-inducing coil 107, establishing a signal field at a certain identification zone along the railroad tracks, so that any responder coming within the effective identification zone will be excited by the interrogator signal. It will be seen that the disclosed transmitter arrangement allows provision of a single sideband signal without use of a modulator, and by use exclusively of radio frequency oscillators, whereas prior single sideband systems required audio oscillators and modulators.

The responder 108 illustrated in FIG. 1 is shown as including an input tuned circuit 109 comprising inductor L–1 and capacitor C–1, which is tuned to receive the carrier and all sideband frequencies of the interrogator signal. Connected to tuned circuit 109 is a coding network shown as comprising two crystal filters F–1 and F–2, each of which are provided with an individual series-resonance frequency corresponding to a different one of the ten sideband frequencies of the interrogator signal. The crystals serve to short tuned circuit 109 at the two selected frequencies, so that the voltage induced in the responder and present between points A and B will contain components of the carrier frequency $f_0$ and all interrogator sideband frequencies other than the two trapped out by the filters F–1 and F–2. Upon demodulation, by the demodulator shown as comprising diode X–1 and capacitor C–2, a composite voltage exists between points C and D having all components $f_1$, $f_2$, etc., up to $f_n$ (except for the two filtered out) superimposed upon a direct component resulting from detection of the carrier. The composite voltage is applied as shown to operate a response oscillator comprising transistor T–1, tuned circuit 110, tickler coil L–3, resistor R–6 and capacitor C–4. The composite voltage is applied through tank circuit 110 across the collector-emitter circuit of transistor T–1, so that the audio components not filtered out are modulated upon the carrier produced by the response oscillator. While two filters are illustrated as the coding means in FIG. 1, it will be understood that some responders may use only one filter, while others will use many more, and different responders may use filters of different sideband frequencies, in order that a large number of responders may be coded differently, if desired.

The response signal emanating from responder 108 while it is operated by the interrogator signal is picked up in response pickup coil 112, which may be located very near interrogator coil 107. The picked up response signal is amplified, if desired, by amplifier 113 and then applied to a plurality of conventional synchronous detectors, such as 117, 118 and 119. A separate synchronous detector is provided for each sideband frequency utilized in the system. The output signals of carrier oscillator 102 and each of the sideband oscillators are routed to a plurality of conventional mixer circuits, such as 114, 115, 116, a separate mixer circuit being provided for each sideband frequency utilized in the system. Each mixer circuit heterodynes the carrier and one sideband frequency to obtain their difference, and the difference frequency output from each mixer as applied as one input of a respective synchronous detector. For example, carrier frequency $f_0$ and sideband frequency $(f_0+f_1)$ are combined in mixer 114 to provide a difference signal of frequency $f_1$, which is applied as one input to synchronous detector 117, to be compared with any components of $f_1$ frequency present in the amplified received signal from amplifier 113. Since the phase and frequency of each lower frequency modulated on the response carrier depends directly on the phase and frequency relationships between the original carrier and original sideband oscillator frequencies of the interrogator, application of the original signals to mixers to derive difference reference signals for the synchronous detectors will allow the synchronous detectors to reject as noise any components of the amplified response signal which do not have proper phase and frequency relationships to the original signals. Mixing of the carrier signal $f_0$ with any sideband frequency provides sum and difference frequencies as well as the carrier frequency and the sideband frequency, and as well as various other modulation products. All other frequencies produced by the mixer, however, will be much higher than the difference frequency, so simple and inexpensive low-pass RC filter means may be used to filter out all but the desired difference frequency component. Such low-pass filters are shown separately in FIG. 1 at 131, 132 and 133, but in many embodiments they will comprise, at least in part, merely load resistance and stray capacity. The output signals from the synchronous detectors on conductors 120,

121, 122, etc., form a parallel digital signal. The voltage on each conductor may be applied through a respective low pass filter and rectified, if desired, and used to operate a respective stage of a register.

The output signal of amplifier 113 also may be applied to a further demodulator (not shown), such as a conventional radio receiver AGC circuit, to derive an automatic gain control potential commensurate with received signal strength. The AGC potential may be compared with a reference by means of a difference detector or threshold detector (not shown) which in turn may control the gain of amplifier 106, the condition of gating circuits (not shown) connected between conductors 120–122 etc., and the register, and circuitry (not shown) adapted to provide register clearing pulses, in the manner disclosed in appl. Ser. No. 739,909.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. An interrogator responder signalling system, comprising in combination; a transmitter unit for providing an interrogator signal comprised of an interrogator carrier component and a first plurality of discrete sideband components, said transmitter unit including a carrier frequency generating means, a plurality of sideband frequency generating means and interrogator output circuit means for combining said signal components and emitting said interrogator signal; a responder unit movable relative to said transmitter unit, said responder unit having response signal generating means operated by said interrogator signal whenever said units are within a selected distance from each other, to provide a coded response signal comprised of a response carrier component differing in frequency from said interrogator carrier component and a second plurality of discrete sideband components; and response receiver means for receiving said coded response signal, said receiver means including a plurality of mixer circuits equal in number to said first plurality of discrete sideband components; circuit means connecting the carrier frequency signal from said carrier frequency generating means of said transmitter unit to each of said mixer circuits, further circuit means connecting the sideband frequency signals from said sideband frequency generating means to respective mixer circuits, thereby to derive a plurality of difference frequency signals from said mixer circuits; and a plurality of synchronous detector circuits, each of said synchronous detector circuits being connected to said response receiver means to receive said coded response signal and connected to an individual one of said difference frequency signals.

2. Apparatus according to claim 1 in which each of said discrete sideband components differs in frequency from said interrogator carrier component by different amount, and in which said response signal generating means provides a coded response signal having double sideband modulation, each of said synchronous detectors being operable to detect only one of each pair of sideband components of said coded response signal.

References Cited in the file of this patent

UNITED STATES PATENTS

| | | |
|---|---|---|
| 2,753,550 | Treharne | July 3, 1956 |
| 2,817,012 | Kendall | Dec. 17, 1957 |